United States Patent
Wu et al.

(10) Patent No.: US 11,494,926 B1
(45) Date of Patent: Nov. 8, 2022

(54) METHOD FOR PERFORMING HYBRID DEPTH DETECTION WITH AID OF ADAPTIVE PROJECTOR, AND ASSOCIATED APPARATUS

(71) Applicants: HIMAX TECHNOLOGIES LIMITED, Tainan (TW); LIQXTAL TECHNOLOGY INC., Tainan (TW)

(72) Inventors: Biing-Seng Wu, Tainan (TW); Pen-Hsin Chen, Tainan (TW); Ching-Wen Wang, Tainan (TW); Cheng-Che Tsai, Tainan (TW); Hung-Shan Chen, Tainan (TW); Yi Hung, Tainan (TW); Ming-Syuan Chen, Tainan (TW); Hsueh-Tsung Lu, Tainan (TW); Wu-Feng Chen, Tainan (TW)

(73) Assignees: HIMAX TECHNOLOGIES LIMITED, Tainan (TW); LIQXTAL TECHNOLOGY INC., Tainan (TW)

(*) Notice: Subject to any disclaimer, the term of this patent is extended or adjusted under 35 U.S.C. 154(b) by 13 days.

(21) Appl. No.: 17/364,920

(22) Filed: Jul. 1, 2021

(51) Int. Cl.
*G06T 7/521* (2017.01)
*H04N 5/232* (2006.01)
(Continued)

(52) U.S. Cl.
CPC .............. *G06T 7/521* (2017.01); *G01S 17/86* (2020.01); *G01S 17/89* (2013.01);
(Continued)

(58) Field of Classification Search
CPC ........... G06T 7/521; G06T 2207/10028; G06T 2207/30201; G01S 17/86; G01S 17/89; H04N 5/23229
See application file for complete search history.

(56) References Cited

U.S. PATENT DOCUMENTS 10,306,203 B1 * 5/2019 Goyal ................... H04N 13/271
10,482,618 B2 * 11/2019 Jain ............................ G06T 7/44
(Continued)

FOREIGN PATENT DOCUMENTS

| EP | 3067860 A2 * | 9/2016 | ............. G06T 7/571 |
| WO | WO-2014014838 A2 * | 1/2014 | ............. G06F 3/013 |
| WO | WO-2019125427 A1 * | 6/2019 | ............... G06T 7/55 |

OTHER PUBLICATIONS

Koninckx et al., Real-Time Range Acquisition by Adaptive Structured Light, IEEE Transactions on Pattern Analysis and Machine Intelligence, vol. 28, No. 3 pp. 432-445 (Year: 2006).*

*Primary Examiner* — Fernando Alcon
(74) *Attorney, Agent, or Firm* — Winston Hsu

(57) ABSTRACT

A method for performing hybrid depth detection with aid of an adaptive projector and associated apparatus are provided. The method includes: utilizing an image processing circuit to obtain distance information; utilizing the image processing circuit to determine a distance range according to the distance information; utilizing the image processing circuit to perform projection type selection to determine at least one selected projection type corresponding to the distance range among multiple predetermined projection types; utilizing the adaptive projector to perform projection of the at least one selected projection type to capture at least one corresponding image with a camera, and utilizing the image processing circuit to perform depth detection according to corresponding image to generate depth map; and utilizing the image processing circuit to selectively output the depth map as resultant depth map or perform depth data combination to generate combined depth map as resultant depth map.

11 Claims, 10 Drawing Sheets

(51) Int. Cl.
  *G01S 17/89* (2020.01)
  *G01S 17/86* (2020.01)
(52) U.S. Cl.
  CPC .................. *H04N 5/23229* (2013.01); *G06T 2207/10028* (2013.01); *G06T 2207/30201* (2013.01)

(56) References Cited

U.S. PATENT DOCUMENTS

| | | | |
|---|---|---|---|
| 10,891,745 B1* | 1/2021 | Potter | G01S 17/931 |
| 10,901,092 B1* | 1/2021 | Kantor | G01S 7/4815 |
| 2016/0205378 A1* | 7/2016 | Nevet | H04N 13/239 |
| | | | 348/47 |
| 2017/0347079 A1* | 11/2017 | Wang | H04N 9/3188 |
| 2018/0293746 A1* | 10/2018 | Rosman | G06T 7/521 |
| 2018/0321384 A1* | 11/2018 | Lindner | G01S 7/4911 |
| 2019/0174118 A1* | 6/2019 | Wei | H04N 13/254 |
| 2019/0295279 A1* | 9/2019 | Wang | H04N 5/2352 |
| 2021/0209778 A1* | 7/2021 | Chan | G01B 11/254 |

\* cited by examiner (a) High density sub-pattern (b) Low density sub-pattern (c) Multi-density sub-pattern (d) Multi-zone multi-density pattern (a) Original FOI (b) FOI switching in one directions (c) FOI switching in two directions

METHOD FOR PERFORMING HYBRID DEPTH DETECTION WITH AID OF ADAPTIVE PROJECTOR, AND ASSOCIATED APPARATUS

BACKGROUND OF THE INVENTION

1. Field of the Invention

The present invention relates to detection mechanism for electronic devices such as mobile devices, and more particularly, to a method for performing hybrid depth detection with aid of an adaptive projector, and associated apparatus such as a hybrid depth detection device, an image processing circuit within the hybrid depth detection device, a depth processor within the image processing circuit, the adaptive projector within the hybrid depth detection device, etc.

2. Description of the Prior Art

According to the related art, face recognition technologies have been applied to mobile devices, and some face recognition methods for use of the mobile devices have been proposed. However, some problems may occur. For example, when one or more of the mobile devices cannot perform face recognition correctly, a security issue is introduced. There may be a bottleneck of further improvement of the face recognition algorithms. Hence, there is a need for a novel method and associated architecture to enhance the overall performance of an electronic device without introducing a side effect or in a way that is less likely to introduce a side effect.

SUMMARY OF THE INVENTION

It is therefore an objective of the present invention to provide a method for performing hybrid depth detection with aid of an adaptive projector, and to provide associated apparatus such as a hybrid depth detection device, an image processing circuit within the hybrid depth detection device, a depth processor within the image processing circuit, the adaptive projector within the hybrid depth detection device, etc., in order to solve the above-mentioned problems.

At least one embodiment of the present invention provides a method for performing hybrid depth detection with aid of an adaptive projector, where the method may comprise: utilizing an image processing circuit within a hybrid depth detection device to obtain distance information, wherein the distance information indicates a distance between the hybrid depth detection device and one or more target objects; utilizing the image processing circuit to determine a distance range according to the distance information, wherein the distance range is selected from multiple predetermined distance ranges regarding the distance; utilizing the image processing circuit to perform projection type selection to determine at least one selected projection type corresponding to the distance range among multiple predetermined projection types, wherein the at least one selected projection type is selected from the multiple predetermined projection types; utilizing the adaptive projector within the hybrid depth detection device to perform projection of the at least one selected projection type to capture at least one corresponding image with a camera, and utilizing the image processing circuit to perform at least one type of depth detection corresponding to the at least one selected projection type among multiple types of depth detection according to the at least one corresponding image to generate at least one depth map; and in response to the at least one selected projection type, utilizing the image processing circuit to selectively output the at least one depth map as a resultant depth map or perform depth data combination according to the at least one depth map to generate a combined depth map as the resultant depth map.

At least one embodiment of the present invention provides associated apparatus operating according to the method mentioned above. Examples of the apparatus may include, but are not limited to: a hybrid depth detection device, an electronic product (e.g. an electronic device such as a mobile device) equipped with the hybrid depth detection device, the image processing circuit within the hybrid depth detection device, a depth processor within the image processing circuit, the adaptive projector within the hybrid depth detection device, etc.

At least one embodiment of the present invention provides an apparatus for performing hybrid depth detection, where the apparatus may comprise an image processing circuit, and further comprise a camera and an adaptive projector that are coupled to the image processing circuit. For example, the image processing circuit can be arranged to obtain distance information, determines a distance range according to the distance information, and perform projection type selection to determine at least one selected projection type corresponding to the distance range among multiple predetermined projection types, wherein the distance information indicates a distance between the hybrid depth detection device and one or more target objects, the distance range is selected from multiple predetermined distance ranges regarding the distance, and the at least one selected projection type is selected from the multiple predetermined projection types; the adaptive projector can be arranged to perform projection of the at least one selected projection type to allow the hybrid depth detection device to capture at least one corresponding image with the camera; and the camera can be arranged to capture the at least one corresponding image. More particularly, the image processing circuit performs at least one type of depth detection corresponding to the at least one selected projection type among multiple types of depth detection according to the at least one corresponding image to generate at least one depth map. In response to the at least one selected projection type, the image processing circuit selectively outputs the at least one depth map as a resultant depth map or performs depth data combination according to the at least one depth map to generate a combined depth map as the resultant depth map.

The present invention method and associated apparatus (e.g. the hybrid depth detection device, the image processing circuit within the hybrid depth detection device, the depth processor within the image processing circuit, and the adaptive projector within the hybrid depth detection device) can guarantee that various electronic products equipped with the hybrid depth detection device can operate properly in various situations, respectively. In addition, the present invention method and associated apparatus can utilize the adaptive projector to perform different types of projection to capture corresponding images with the camera respectively, and can perform different types of depth detection according to the corresponding images to generate different intermediate depth maps respectively, and can further perform depth data combination according to the intermediate depth maps to generate a combined depth map such as a weighted depth map, to perform the hybrid depth detection accurately and efficiently. In comparison with the related art, the present invention method and associated apparatus can enhance overall performance without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method for performing hybrid depth detection with aid of an adaptive projector, and associated apparatus such as at least one portion (e.g. a portion or all) of a hybrid depth detection device. The hybrid depth detection device can operate according to the method to perform depth detection accurately and efficiently, to achieve optimal performance of any electronic product equipped with the hybrid depth detection device. More particularly, the hybrid depth detection device can perform the hybrid depth detection accurately and efficiently to generate one or more depth maps, such as depth maps of human faces, to make the electronic product perform three-dimensional (3D) face recognition according to the one or more depth maps accurately and efficiently, but the present invention is not limited thereto. Examples of the one or more depth maps may include, but are not limited to: depth maps of human faces, indoor or outdoor places, etc. In addition, the electronic product can utilize the hybrid depth detection device to generate at least one depth map corresponding to at least one user of the electronic product, for establishing a 3D face database of the at least one depth map in advance, and can compare a target depth map of a person's face among the one or more depth maps with any depth map of the at least one depth map to determine whether this person is any user of the at least one user. If the target depth map matches the any depth map (e.g. this person is the any user), the electronic product can provide services to this person; otherwise (e.g. this person is not any of the at least one user), the electronic product can prevent this person from using any of the services. Examples of the electronic product may include, but are not limited to: a mobile device such as a multifunctional mobile phone, a tablet, a wearable device, an all-in-one (AIO) computer, and a laptop computer.

Figure 1:
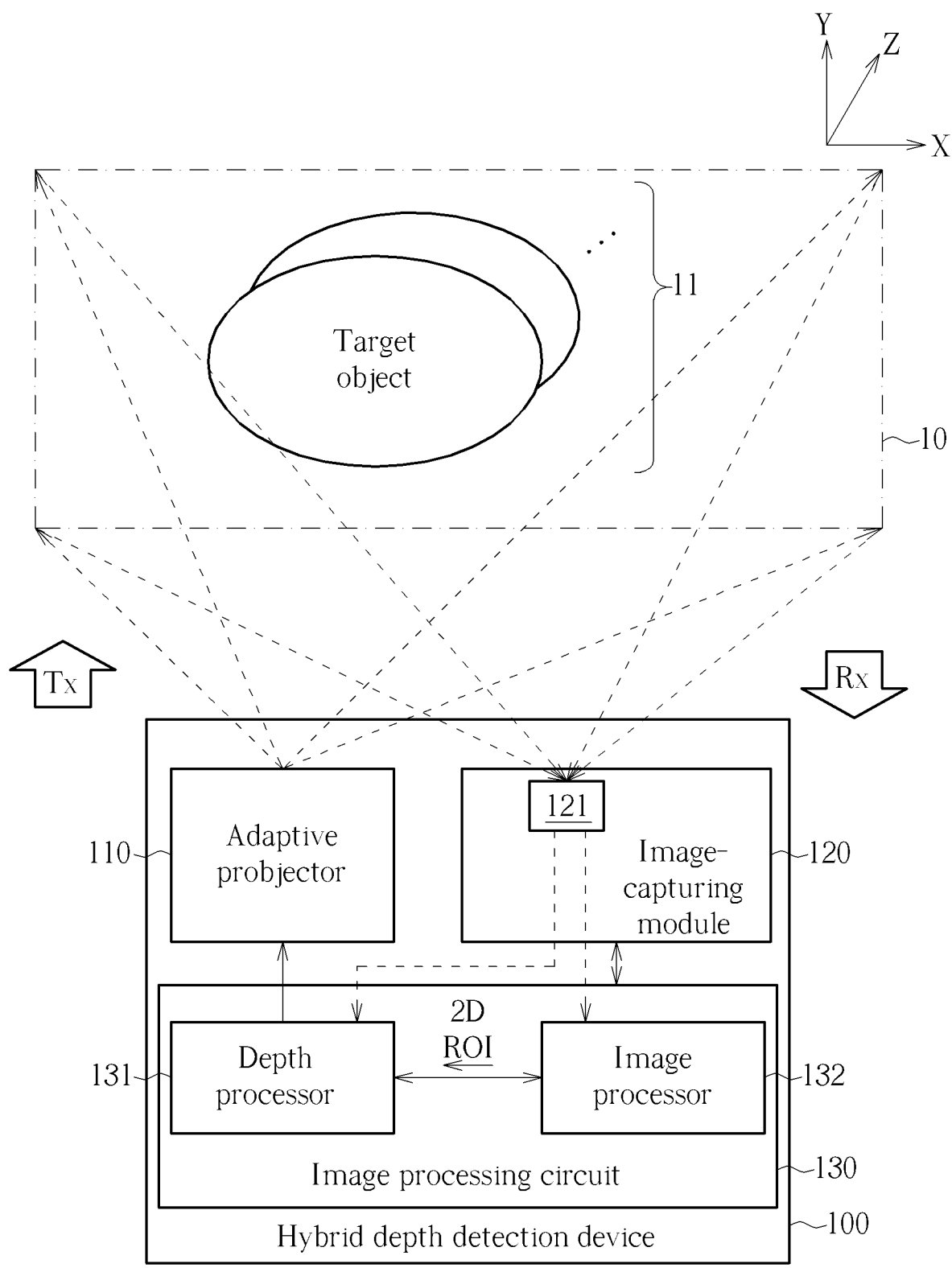
FIG. 1 is a diagram of a hybrid depth detection device according to an embodiment of the present invention.

FIG. 1 is a diagram of a hybrid depth detection device 100 according to an embodiment of the present invention, where the hybrid depth detection device 100 and the adaptive projector 110 therein can be taken as examples of the hybrid depth detection device and the adaptive projector mentioned above, respectively. For better comprehension, a field 10 and one or more target objects 11 may be illustrated with reference to the X-axis, the Y-axis and the Z-axis on the upper half of FIG. 1, but the present invention is not limited thereto. For example, the field 10 (e.g. the shape, the associated sizes and/or the associated angles thereof) and the one or more target objects 11 (e.g. the object count, the shapes, the associated sizes and/or the associated locations thereof) may vary.

As shown in FIG. 1, in addition to the adaptive projector 110, the hybrid depth detection device 100 may further comprise an image-capturing module 120 and an image processing circuit 130, where the adaptive projector 110 and the image-capturing module 120 are coupled to the image processing circuit 130. For example, the image-capturing module 120 may comprise at least one camera (e.g. one or more cameras) such as a camera 121, and the image processing circuit 130 may comprise at least one processor (e.g. one or more processors) such as a depth processor 131 and an image processor 132 respectively corresponding to depth-related processing and two-dimensional (2D) image processing, but the present invention is not limited thereto. In some embodiments, the depth processor 131 and the image processor 132 may be integrated into the same processor.

The adaptive projector 110 can be arranged to project one or more predetermined patterns of invisible light (e.g. infrared (IR) or lights of other wavebands). For example, a laser module within the adaptive projector 110 may comprise a light emitter and some optical components, where the light emitter may comprise a vertical-cavity surface-emitting laser (VCSEL) array, for emitting invisible light, and the optical components may comprise a diffractive optical element (DOE), a micro-lens array, a wafer-level optics (WLO) component, for generating the one or more predetermined patterns. More particularly, the WLO component may comprise at least one wafer-level lens (e.g. one or more wafer-level lenses). In addition, the adaptive projector 110 may further comprise one or more electrically-controlled optical components such as at least one liquid crystal (LC) lens (e.g. one or more LC lenses, any of which may be positioned within or outside the laser module), for changing (e.g. narrowing or expanding) one or more projection fields of the one or more predetermined patterns and/or switching between different types of projection (e.g. a first projection type regarding pattern projection of the one or more predetermined patterns, and a second projection type regarding non-pattern projection of no pattern).

For better comprehension, multiple light transmitting (Tx) paths from the adaptive projector 110 to the field 10 (e.g. invisible light Tx paths of invisible light from the adaptive projector 110 to the field 10) may be collectively expressed with the Tx direction (labeled "Tx" for brevity), and multiple light receiving (Rx) paths from the field 10 to the camera 121 (e.g. invisible light Rx paths of invisible light from the one or more target objects 11 to the camera 121) may be collectively expressed with the Rx direction (labeled "Rx" for brevity).

During the depth detection such as the hybrid depth detection, the hybrid depth detection device 100 (e.g. the components therein) can perform the following operations:

(1) the camera 121 can capture an image, where the image comprises image contents indicating one or more objects (e.g. the one or more target objects 11), and the image typically does not have depth information, and may represent a two-dimensional (2D) image;

(2) the image processing circuit 130 (e.g. a first partial circuit thereof, such as the image processor 132) can determine a region-of-interest (ROI) of the image captured by the camera 121 (e.g. a region of a human face, such as a region enclosing the face of the person mentioned above on this image) according to the image contents of this image, for further processing of the image processing circuit 130 (e.g. a second partial circuit thereof);

(3) the image processing circuit 130 (e.g. the second partial circuit thereof, such as the depth processor 131) can perform projection type selection to determine at least one selected projection type (e.g. one or more selected projection types) corresponding to a selected distance range among multiple predetermined projection types (e.g. the first projection type and the second projection type), where according to distance information obtained in advance, the distance range can be selected from multiple predetermined distance ranges regarding the distance between the hybrid depth detection device 100 and the one or more target objects 11, and the at least one selected projection type can be selected from the multiple predetermined projection types;

(4) the adaptive projector 110 can perform projection of the at least one selected projection type, and more particularly, perform projection of the multiple predetermined projection types (e.g. the first projection type and the second projection type), such as the pattern projection and the non-pattern projection, to capture corresponding images with the camera 121, respectively, where the non-pattern projection can be designed to generate uniform/quasi-uniform illumination or partial-uniform illumination (e.g. flood-type illumination, as uniform as possible);

(5) the image processing circuit 130 (e.g. the second partial such as the depth processor 131) can perform at least one type of depth detection (e.g. one or more types of depth detection) corresponding to the at least one selected projection type among multiple types of depth detection (e.g. first depth detection corresponding to the first projection type, such as pattern-detection-type depth detection, and second depth detection corresponding to the second projection type, such as Time-of-Flight (TOF)-type depth detection), and more particularly, perform the multiple types of depth detection (e.g. the first depth detection such as the pattern-detection-type depth detection, and the second depth detection such as the TOF-type depth detection) according to the corresponding images to generate a first depth map and a second depth map, respectively, where the first depth map and the second depth map can be regarded as intermediate depth maps; and (6) the image processing circuit 130 (e.g. the second partial circuit such as the depth processor 131) can perform depth data combination according to the first depth map and the second depth map to generate a combined depth map such as a weighted depth map;

where the depth data combination can be performed with reference to the distance range, the distance between the hybrid depth detection device 100 and the one or more target objects 11 as indicated by the distance information, and/or the ROI.

For example, the image processing circuit 130 (e.g. the second partial circuit of the image processing circuit 130, such as the depth processor 131) can determine the respective weighting values of the first depth map and the second depth map according to the distance range, and more particularly, can adjust (e.g. fine-tune) the respective weighting values of the first depth map and the second depth map in a depth-by-depth/pixel-by-pixel manner with respect to a predetermined region within the weighted depth map, for enhancing the depth accuracy at the edges of the one or more objects and generating the weighted depth map accurately and efficiently, but the present invention is not limited thereto. For example, the predetermined region may comprise the whole of the weighted depth map. In some examples, the predetermined region may comprise a portion of the weighted depth map, such as a first adjustment region (e.g. a first fine-tuning region) corresponding to the ROI within the weighted depth map, a second adjustment region (e.g. a second fine-tuning region) corresponding to a subregion of the ROI within the weighted depth map, etc.

As the one or more depth maps such as the target depth map, the at least one depth map such as the any depth map, etc. can be generated in the same manner as that of the combined depth map such as the weighted depth map, the hybrid depth detection device 100 can perform the hybrid depth detection accurately and efficiently.

Some implementation details regarding the architecture shown in FIG. 1 can be further described as follows. For example, the first partial circuit of the image processing circuit 130, such as the image processor 132, can generate ROI information indicating the ROI, such as 2D ROI information indicating the ROI of the 2D image (labeled "2D ROI" in FIG. 1 for better comprehension). In addition, the second partial circuit of the image processing circuit 130, such as the depth processor 131, can obtain the ROI information indicating the ROI from the first partial circuit such as the image processor 132, and therefore can be notified of the ROI, for performing the associated processing such as adjusting (e.g. fine-tuning) the weighting values of the intermediate depth maps as mentioned above. Additionally, the hybrid depth detection device 100 can utilize the image processing circuit 130 (e.g. the depth processor 131) to generate one or more control signals for controlling the adaptive projector 110. For example, one or more driving circuits within the image processing circuit 130 can be arranged to generate the one or more control signals under control of the depth processor 131, for controlling (e.g. driving) the adaptive projector 110, where the one or more control signals may carry projection type information indicating the at least one selected projection type (e.g. the first projection type and/or the second projection type), for notifying the adaptive projector 110 of the at least one selected projection type.

As the hybrid depth detection device 100 (e.g. the components therein, such as the adaptive projector 110, the image processing circuit 130, and the depth processor 131) can operate according to the method, the hybrid depth detection device 100 can perform the hybrid depth detection accurately and efficiently to generate the one or more depth maps, such as the depth maps of the human faces, to make the electronic product equipped with the hybrid depth detection device 100 perform the 3D face recognition according to the one or more depth maps accurately and efficiently. As a result, the overall performance can be enhanced.

According to some embodiments, the image processing circuit 130 (e.g. the depth processor 131) can calculate a set of depths of the first depth map according to the difference between a projection result of a predetermined pattern (e.g. any of the one or more predetermined patterns) and the predetermined pattern, where the projection result may indicate the variation of the predetermined pattern due to non-planar surface of the human face. More particularly, the predetermined pattern may comprise a plurality of sub-patterns (e.g. a plurality of invisible-light tiles), and based on the knowledge of the associated geometric relationships, the image processing circuit 130 (e.g. the depth processor 131) can calculate the set of depths according to the displacements of some sub-patterns (e.g. some invisible-light tiles) among the plurality of sub-patterns (e.g. the plurality of invisible-light tiles) of the predetermined pattern, since the depth variations in the set of depths may correspond to the displacements.

Regarding the depth calculations of the set of depths as described above, when a baseline between the center of the adaptive projector 110 (e.g. the location of an optical axis of the optical components on a reference plane on the hybrid depth detection device 100) and the center of the image-capturing module 120 (e.g. the location of the optical axis of the camera 121 on the reference plane) is much shorter than the distance between the hybrid depth detection device 100 and the one or more target objects 11 (e.g. the ratio of the length of the baseline to this distance is less than a predetermined ratio), the image processing circuit 130 (e.g. the depth processor 131) can omit the baseline in the depth calculations, where the length of the baseline can be forcibly set as zero, but the present invention is not limited thereto. In a situation where the baseline is considered, the image processing circuit 130 (e.g. the depth processor 131) can use the real value of the length of the baseline in the depth calculations.

According to some embodiments, the predetermined pattern can be implemented by way of structured-light (SL) technology, etc., where the pattern-detection-type depth detection can be referred to as the SL-type depth detection, but the present invention is not limited thereto. In addition, during the pattern-detection-type depth detection such as the SL-type depth detection, the image processing circuit 130 (e.g. the depth processor 131) can use the displacements as the reference of the depth calculations, but the present invention is not limited thereto. For example, during the TOF-type depth detection, the image processing circuit 130 (e.g. the depth processor 131) can use phase or time differences of light pulses arriving at pixels on the image sensor of the camera 121 as indicators of the distances in the imaging system from the field 10 to the camera 121, to perform the depth calculations.

Figure 2:
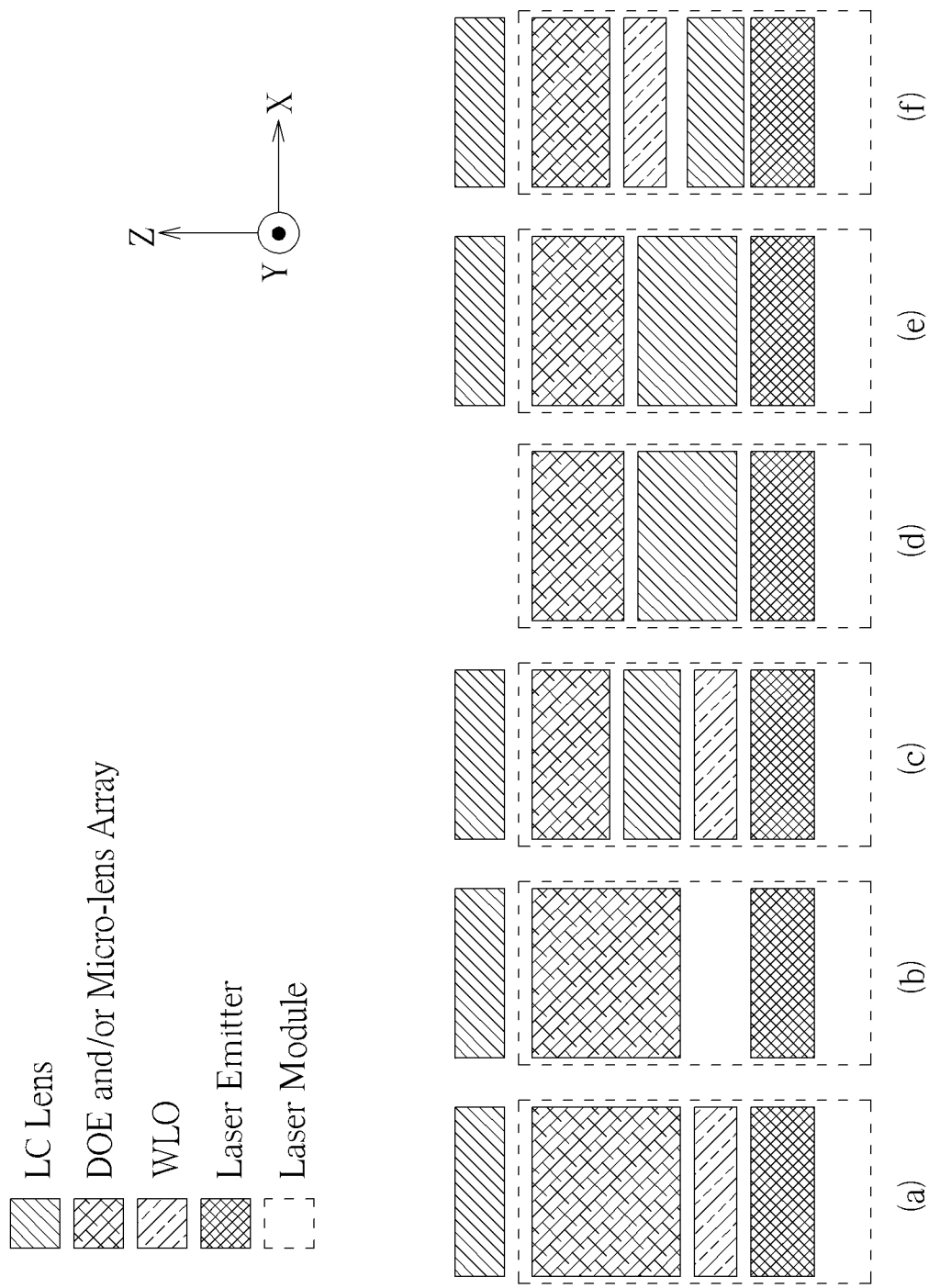
FIG. 2 illustrates some implementation details of the adaptive projector shown in FIG. 1 according to an embodiment of the present invention.

FIG. 2 illustrates some implementation details of the adaptive projector 110 shown in FIG. 1 according to an embodiment of the present invention. The adaptive projector 110 can be implemented by way of various combinations of different sets of components, such as that illustrated in Cases (a), (b), (c), (d), (e) and (f) shown in FIG. 2:

(a) the at least one LC lens comprises a LC lens positioned outside of the laser module, and the WLO component is positioned between the DOE/micro-lens array and the laser emitter;

(b) the at least one LC lens comprises a LC lens positioned outside of the laser module, and no WLO component is used;

(c) in a Type-1 configuration, the at least one LC lens comprises a first LC lens positioned outside of the laser module and a second LC lens positioned within the laser module, the DOE/micro-lens array is positioned between the first LC lens and the second LC lens, and the WLO component is positioned between the second LC lens and the laser emitter;

(d) the at least one LC lens comprises a LC lens positioned within the laser module, between the DOE/micro-lens array and the laser emitter, and no WLO component is used;

(e) the at least one LC lens comprises a first LC lens positioned outside of the laser module and a second LC lens positioned within the laser module, between the DOE/micro-lens array and the laser emitter, and no WLO component is used; and (f) in a Type-2 configuration, the at least one LC lens comprises a first LC lens positioned outside of the laser module and a second LC lens positioned within the laser module, the DOE/micro-lens array is positioned between the first LC lens and the WLO component, and the second LC lens is positioned between the WLO component and the laser emitter;

but the present invention is not limited thereto. For example, as long as similar results can be achieved, some components may be integrated into the same component and/or one or more components may be added, removed, or changed.

According to some embodiments, the laser emitter may comprise at least one invisible-light source (e.g. one or more invisible-light sources), such as the VCSEL array, edge-emitting laser diodes (LDs), etc. In addition to the at least one invisible-light source, the laser emitter may further comprise a beam limiting device (e.g. a collimator lens). The beam limiting device can receive the emitted invisible-light from the at least one invisible-light source and convert the emitted invisible-light into beam-limited invisible-light. For brevity, similar descriptions for these embodiments are not repeated in detail here.

According to some embodiments, any LC lens of the at least one LC lens (e.g. any of the LC lenses shown in FIG. 2) can be implemented by way of multiple LC lens components (e.g. LC lens components that are aligned to the optical axis of this LC lens and are positioned in predetermined locations according to the optical design of this LC lens, which can be referred to as cascaded LC lens components for brevity), but the present invention is not limited thereto. In some embodiments, the any LC lens can be implemented by way of a single LC lens component (e.g. a compact LC lens component that is designed to have all optical features as required for this LC lens).

Regarding any type of projection among the multiple predetermined projection types (e.g. the first projection type and the second projection type), the image processing circuit 130 (e.g. the second partial circuit such as the depth processor 131) can control the adaptive projector 110 (e.g. a certain LC lens among the at least one LC lens) to change (e.g. narrow or expand) the projection field of this type of projection. For example, when this type of projection represent the first projection type regarding the pattern projection of the one or more predetermined patterns, the image processing circuit 130 (e.g. the second partial circuit such as the depth processor 131) can control the adaptive projector 110 (e.g. this LC lens) to change (e.g. narrow or expand) the projection field of the pattern projection; and when this type of projection represent the second projection type regarding the non-pattern projection of no pattern, the image processing circuit 130 (e.g. the second partial circuit such as the depth processor 131) can control the adaptive projector 110 (e.g. this LC lens) to change (e.g. narrow or expand) the projection field of the non-pattern projection; but the present invention is not limited thereto. In some embodiments, the image processing circuit 130 (e.g. the second partial circuit such as the depth processor 131) can control the adaptive projector 110 (e.g. this LC lens) to change the projection field of only one type of projection (e.g. the second projection type regarding the non-pattern projection) among the multiple predetermined projection types, rather than controlling the adaptive projector 110 (e.g. this LC lens) to change the projection field of all types of projection among the multiple predetermined projection types. For example, the TOF-type depth detection can achieve better depth detection accuracy than the pattern-detection-type depth detection for a normal/long-distance target object at a normal distance or long distances (e.g. distances greater than the normal distance), and the pattern-detection-type depth detection can achieve very high depth detection accuracy for a short-distance target object at a short distance (e.g. a distance shorter than the normal distance) except for object edges of the short-distance target object. The image processing circuit 130 (e.g. the second partial circuit such as the depth processor 131) can trigger the non-pattern projection and perform the TOF-type depth detection on the normal/long-distance target object to achieve the aforementioned better depth detection accuracy. In addition, the image processing circuit 130 (e.g. the second partial circuit such as the depth processor 131) can trigger the pattern projection and perform the pattern-detection-type depth detection on the short-distance target object to achieve the aforementioned very high depth detection accuracy, and further trigger the non-pattern projection and perform the TOF-type depth detection on the short-distance target object to adjust (e.g. fine-tune) some depths at the object edges of the short-distance target object, in order to enhance the depth detection accuracy for the object edges of the short-distance target object. Therefore, the present invention method and associated apparatus can enhance overall performance without introducing any side effect or in a way that is less likely to introduce a side effect.

According to some embodiments, one or more components (e.g. one or more of the DOE, the micro-lens array, and the WLO component) within the adaptive projector 110 can be designed to perform the pattern projection in a narrower projection field, and the image processing circuit 130 (e.g. the depth processor 131) can control the adaptive projector 110 (e.g. the LC lens) to convert the pattern projection into the non-pattern projection in the narrower projection field, but the present invention is not limited thereto. For example, one or more components (e.g. one or more of the DOE, the micro-lens array, and the WLO component) within the adaptive projector 110 can be designed to perform the pattern projection in a wider projection field, and the image processing circuit 130 (e.g. the depth processor 131) can control the adaptive projector 110 (e.g. the LC lens) to convert the pattern projection into the non-pattern projection in the wider projection field.

Figure 3:
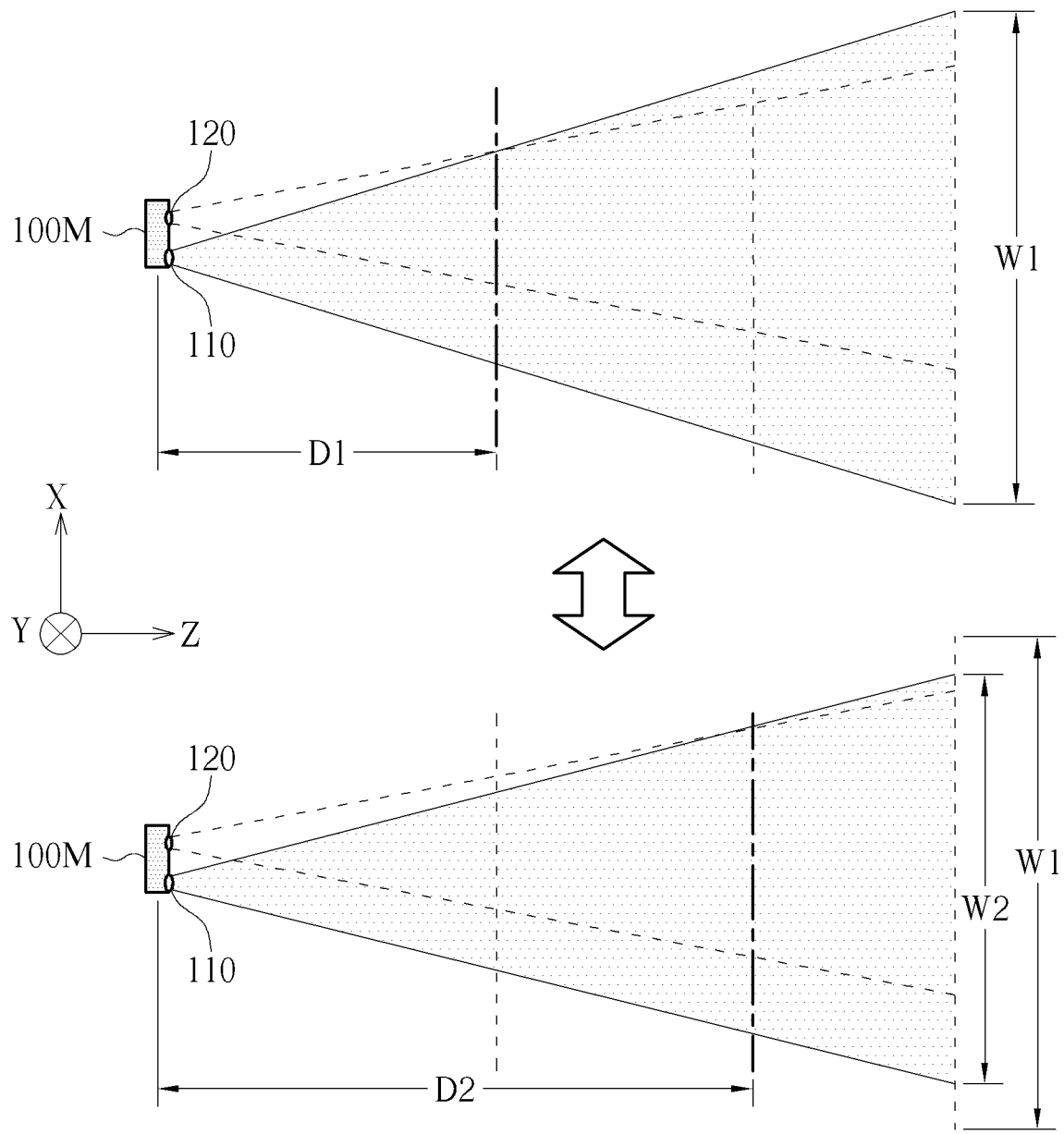
FIG. 3 illustrates an adaptive field control scheme of a method for performing hybrid depth detection with aid of the adaptive projector according to an embodiment of the present invention.

FIG. 3 illustrates an adaptive field control scheme of the method for performing hybrid depth detection with aid of the adaptive projector according to an embodiment of the present invention. For better comprehension, the hybrid depth detection device 100 (e.g. the components therein, such as the adaptive projector 110 and the image-capturing module 120) can be integrated into the electronic product 100M such as the mobile device, etc., and can operate with some parameters (e.g. the distances D1 and D2, the widths W1 and W2, and the associated angles) according to the adaptive field control scheme as shown in FIG. 3, where the distances D1 and D2 may represent a minimum working distance and the normal distance, respectively, and the short distance may fall within the range of the interval [D1, D2). These parameters (e.g. the distances D1 and D2, the widths W1 and W2, and the associated angles) and the size and the shape of the electronic product 100M are for illustrative purposes only, and should not be regarded as a limitation of the present invention. In some embodiments, these parameters and the size and the shape of the electronic product 100M may vary.

As shown in the upper half of FIG. 3, the image processing circuit 130 (e.g. the second partial circuit such as the depth processor 131) can trigger the pattern projection and perform the pattern-detection-type depth detection on the short-distance target object, where the image processing circuit 130 (e.g. the second partial circuit such as the depth processor 131) can control the adaptive projector 110 (e.g. this LC lens) to use a fixed projection field during performing the pattern projection. In addition, the image processing circuit 130 (e.g. the second partial circuit such as the depth processor 131) can trigger the non-pattern projection and perform the TOF-type depth detection on the short-distance target object to adjust (e.g. fine-tune) the depths at the object edges of the short-distance target object, where the projection field of the non-pattern projection is changeable when there is a need. As shown in the lower half of FIG. 3, the image processing circuit 130 (e.g. the second partial circuit such as the depth processor 131) can trigger the non-pattern projection and perform the TOF-type depth detection on the normal/long-distance target object. For brevity, similar descriptions for this embodiment are not repeated in detail here.

Figure 4:
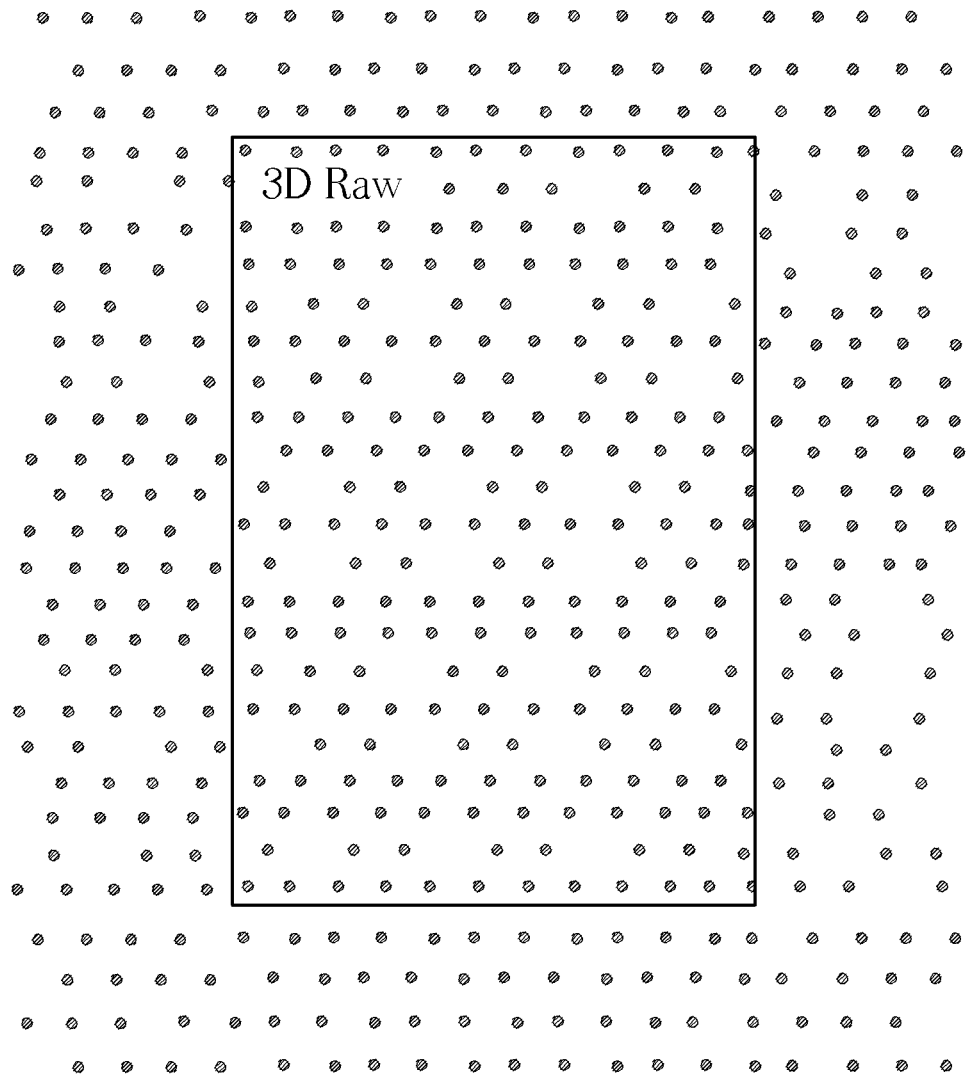
FIG. 4 illustrates a projection result of pattern projection in an adaptive projection-type control scheme of the method according to an embodiment of the present invention.

FIG. 4 illustrates a projection result of the pattern projection in an adaptive projection-type control scheme of the method according to an embodiment of the present invention. For better comprehension, assume that the short-distance target object is a planar target, but the present invention is not limited thereto. In addition, the short distance may be greater than the distance D1, and more particularly, may fall within the range of the interval (D1, D2). The pattern-adjustable projector 110 can be designed to project the predetermined pattern with fixed projection field. When being projected as the projection result, the plurality of sub-patterns (e.g. the plurality of invisible-light tiles) of the predetermined pattern, such as the spots shown in FIG. 4, can distribute over the fixed projection field. The image processing circuit 130 (e.g. the second partial circuit such as the depth processor 131) can utilize the camera 121 to capture a 3D raw image (labeled "3D Raw" for brevity), for performing the pattern-detection-type depth detection, where the 3D raw image may comprise at least one portion (e.g. a portion or all) of the projection result. For brevity, similar descriptions for this embodiment are not repeated in detail here.

According to some embodiments, the image processing circuit 130 (e.g. the second partial circuit such as the depth processor 131) can control the adaptive projector 110 (e.g. a certain LC lens among the at least one LC lens) to switch between the multiple projection types (e.g. the first projection type regarding the pattern projection of the one or more predetermined patterns, and the second projection type regarding the non-pattern projection of no pattern). For example, the DOE, the micro-lens array, and/or the WLO component can be arranged to generate the one or more predetermined patterns. When it is needed to switch from the first projection type to the second projection type, under control the image processing circuit 130 (e.g. the second partial circuit such as the depth processor 131), the adaptive projector 110 (e.g. this LC lens) can temporarily disable the function of generating the one or more predetermined patterns, for example, by changing a focal length of this LC lens to prevent the one or more predetermined patterns from being outputted via predetermined imaging paths in an optical design regarding the imaging system (e.g. the DOE, the micro-lens array, and/or the WLO component), to make the pattern projection become the non-pattern projection. When it is needed to switch from the second projection type to the first projection type, under control the image processing circuit 130 (e.g. the second partial circuit such as the depth processor 131), the adaptive projector 110 (e.g. this LC lens) can enable the function of generating the one or more predetermined patterns, for example, by changing the focal length of this LC lens back to a predetermined focal length value in this optical design, to make the non-pattern projection become the pattern projection. For brevity, similar descriptions for these embodiments are not repeated in detail here.

Figure 5:
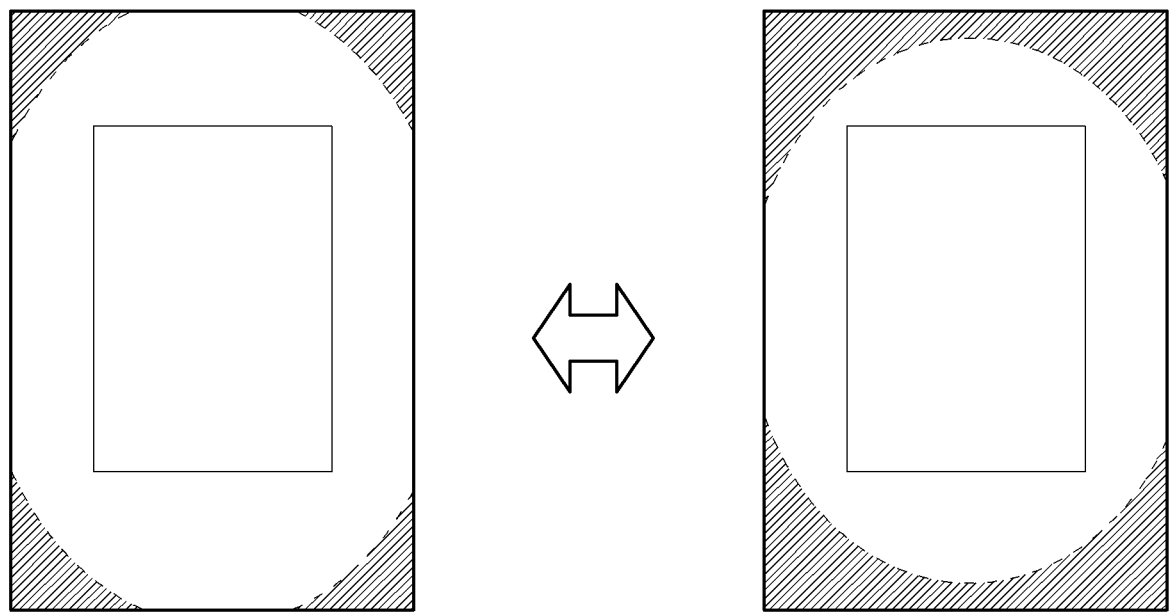
FIG. 5 illustrates some projection results of non-pattern projection in the adaptive projection-type control scheme according to an embodiment of the present invention.

FIG. 5 illustrates some projection results of the non-pattern projection in the adaptive projection-type control scheme according to an embodiment of the present invention. For better comprehension, assume that the short-distance target object and the normal/long-distance target object are planar targets, but the present invention is not limited thereto. In addition, the projection result shown in the left half of FIG. 5 can be taken as an example of the projection result of the non-pattern projection for the short-distance target object at the short distance, and the projection result shown in the right half of FIG. 5 can be taken as an example of the projection result of the non-pattern projection for the normal/long-distance target object at the normal distance or long distances, where the shaded portions may indicate that the illumination uniformity at the corners or the outer areas is not as good as that at the center. When it is needed to perform the TOF-type depth detection on the normal/long-distance target object, the image processing circuit 130 (e.g. the second partial circuit such as the depth processor 131) can control the adaptive projector 110 (e.g. the LC lens) to change (e.g. narrow) the projection field of the non-pattern projection, to make the projection result of the non-pattern projection have narrower distribution with higher intensity within a corresponding projection field as shown in the right half of FIG. 5. When it is needed to perform the TOF-type depth detection on the short-distance target object, the image processing circuit 130 (e.g. the second partial circuit such as the depth processor 131) can control the adaptive projector 110 (e.g. the LC lens) to change (e.g. expand) the projection field of the non-pattern projection, to make the projection result of the non-pattern projection have wider and more uniform distribution over a corresponding projection field as shown in the left half of FIG. 5. For brevity, similar descriptions for this embodiment are not repeated in detail here.

Figure 6:
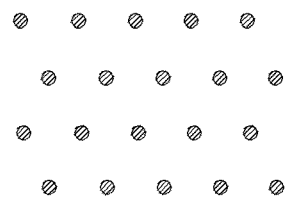
FIG. 6 illustrates an adaptive pattern control scheme of the method according to an embodiment of the present invention.
Figure 6:
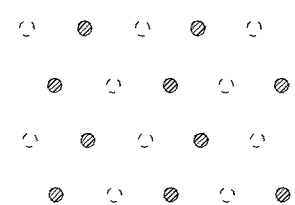
Figure 6:
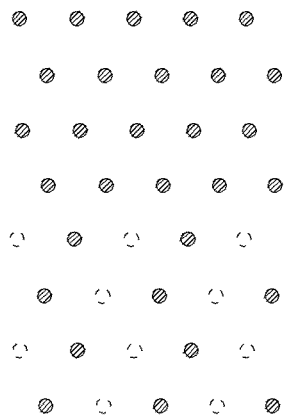
Figure 6:
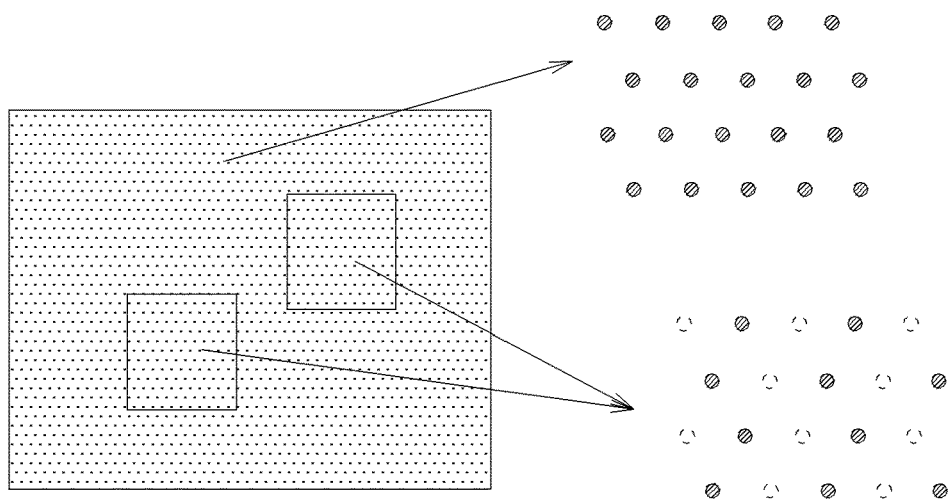

FIG. 6 illustrates an adaptive pattern control scheme of the method according to an embodiment of the present invention. The one or more predetermined pattern can be implemented according to various designs (e.g. by changing parameters, arrangement), such as that illustrated in Cases (a), (b), (c) and (d) shown in FIG. 6:
(a) high density sub-pattern: each sub-pattern of the predetermined pattern may have a high density;
(b) low density sub-pattern: each sub-pattern of the predetermined pattern may have a low density;
(c) multi-density sub-pattern: each sub-pattern of the predetermined pattern may comprise multiple subsets, and respective densities of the multiple subsets of the sub-pattern may comprise different densities (e.g. the densities of Cases (a) and (b) as listed above); and
(d) multi-zone multi-density pattern: the predetermined pattern may comprise multiple zones, where some sub-patterns in one or more zones among the multiple zones may have a first density (e.g. the low density of Case (b) as listed above), and some sub-patterns in one or more other zones among the multiple zones may have a second density (e.g. the high density of Case (a) as listed above);
but the present invention is not limited thereto. For brevity, similar descriptions for this embodiment are not repeated in detail here.

According to some embodiments, the image processing circuit 130 (e.g. the second partial circuit such as the depth processor 131) can control the adaptive projector 110 (e.g. the LC lens) to change the projection field and/or the projection direction of at least one portion (e.g. a portion or all) of the predetermined pattern, such as the projection field and/or the projection direction of a sub-pattern, a secondary sub-pattern (e.g. a subset) of a sub-pattern, etc., to switch among various designs such as that illustrated in Cases (a), (b), (c) and (d) shown in FIG. 6. For brevity, similar descriptions for these embodiments are not repeated in detail here.

Figure 7:
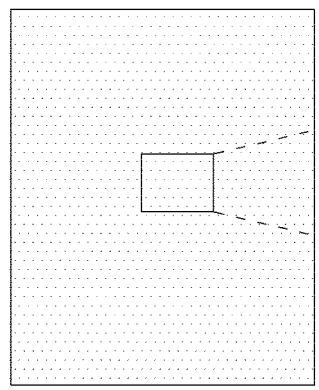
FIG. 7 illustrates an adaptive field-of-illumination (FOI) control scheme of the method according to an embodiment of the present invention.
Figure 7:
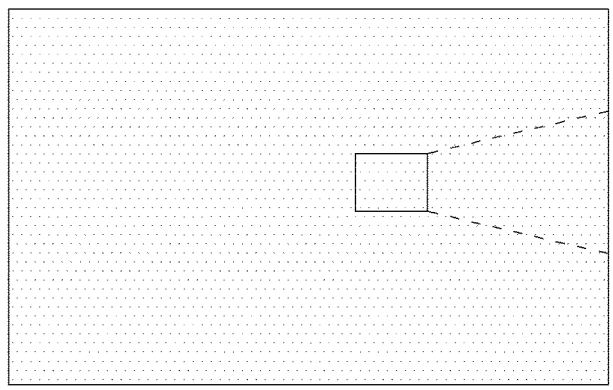
Figure 7:
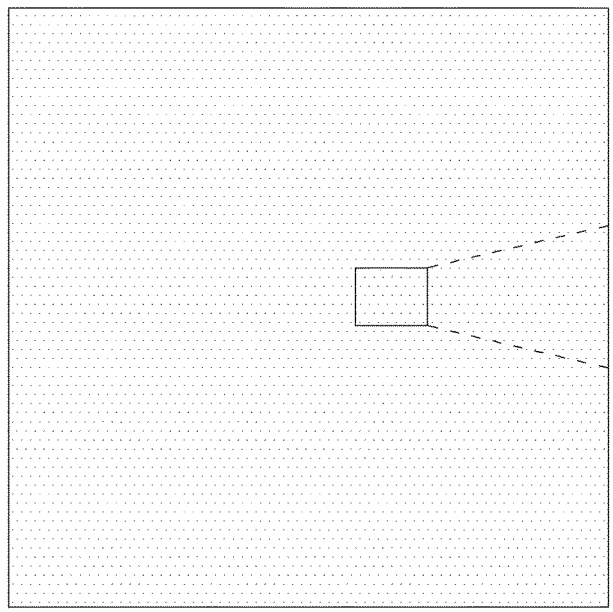

FIG. 7 illustrates an adaptive field-of-illumination (FOI) control scheme of the method according to an embodiment of the present invention. The FOI of the pattern projection can be implemented according to various designs (e.g. by changing the FOI in one or two directions), such as that illustrated in Cases (a), (b) and (c) shown in FIG. 7:
(a) original FOI;
(b) FOI switching in one direction; and
(c) FOI switching in two directions;
but the present invention is not limited thereto. For brevity, similar descriptions for this embodiment are not repeated in detail here.

According to some embodiments, the image processing circuit 130 (e.g. the second partial circuit such as the depth processor 131) can control the adaptive projector 110 (e.g. the LC lens) to change the projection field of at least one portion (e.g. a portion or all) of the predetermined pattern, such as the projection field and/or the projection direction of a sub-pattern, a secondary sub-pattern (e.g. a subset) of a sub-pattern, etc., to switch among various designs such as that illustrated in Cases (a), (b) and (c) shown in FIG. 7. For brevity, similar descriptions for these embodiments are not repeated in detail here.

According to some embodiments, the image processing circuit 130 (e.g. the depth processor 131) can send the 2D image to a System-on-Chip (SoC) to utilize a back-end object detection algorithm running on the SoC to find the ROI (e.g. the location and the sizes such as width and height thereof) enclosing a certain target object (e.g. the human face), making the back-end object detection algorithm running on the SoC return the ROI (e.g. the location and the sizes such as width and height thereof) to the image processing circuit 130 (e.g. the depth processor 131), and the image processing circuit 130 (e.g. the depth processor 131) can calculate a depth average pixel luminance (APL) such as the average of respective luminance (e.g. pixel values) of the pixels within the ROI on the 2D image as a depth statistics index, for determining the distance information such as the distance between the target object (e.g. the human face) and the hybrid depth detection device 100 and therefore determining the selected distance range, but the present invention is not limited thereto. For example, the image processing circuit 130 (e.g. the depth processor 131) can calculate a depth medium such as the medium of respective luminance (e.g. pixel values) of the pixels within the ROI on the 2D image as the depth statistics index, for determining the distance information and therefore determining the selected distance range. Additionally, the image processing circuit 130 (e.g. the depth processor 131) can use the depth APL or the depth medium as an average depth of the depth map during the depth calculation, but the present invention is not limited thereto.

According to some embodiments, the image processing circuit 130 (e.g. the depth processor 131) can calculate any depth of the depths in the weighted depth map (e.g. a weighted depth image) according to the following equation:

$$\text{Depth}_{WEIGHTED}(x,y) = w_1(x,y) \ast \text{Depth}_{SLM}(x,y) + w_2(x,y) \ast \text{Depth}_{TOF}(x,y);$$

where $\text{Depth}_{WEIGHTED}(x, y)$ may represent the any depth at the coordinates (x, y) in the weighted depth map (e.g. the weighted depth image), $\text{Depth}_{SLM}(x, y)$ and $\text{Depth}_{TOF}(x, y)$ may represent corresponding depths at the coordinates (x, y) in the first depth map (e.g. a SL depth map obtained from the SL-type depth detection, such as a SL depth image) and the second depth map (e.g. a TOF depth map obtained from the TOF-type depth detection, such as a TOF depth image), respectively, and $w_1(x, y)$ and $w_2(x, y)$ may represent the associated weighting values, but the present invention is not limited thereto.

According to some embodiments, the image processing circuit 130 (e.g. the depth processor 131) can switch among the multiple predetermined projection types in turn and switch among the multiple types of depth detection correspondingly. Assume that the pattern projection and the non-pattern projection can be respectively referred to as the speckle projection and the fogging projection, which may correspond to their projection results respectively. For example, when the depth statistics index indicates a short-distance range among the multiple predetermined distance ranges, the image processing circuit 130 (e.g. the depth processor 131) can control the adaptive projector 110 to perform the speckle projection and the fogging projection with invisible-light (for invisible-light illumination) in turn, where the output information corresponding to the speckle projection and the fogging projection with invisible-light can be the first depth map (e.g. the SL depth map) and the 2D image, respectively.

In addition, when the depth statistics index indicates a medium-distance range among the multiple predetermined distance ranges, the image processing circuit 130 (e.g. the depth processor 131) can control the adaptive projector 110 to perform the speckle projection, the fogging projection of one cycle with invisible-light (for invisible-light illumination) and the fogging projection of another cycle with invisible-light (for invisible-light illumination) in turn, where the output information corresponding to the speckle projection, the fogging projection of the one cycle with invisible-light and the fogging projection of the other cycle with invisible-light can be the first depth map (e.g. the SL depth map), the second depth map (e.g. the TOF depth map) and the 2D image, respectively, but the present invention is not limited thereto. For example, when the depth statistics index indicates the medium-distance range, the image processing circuit 130 (e.g. the depth processor 131) can control the adaptive projector 110 to perform the speckle projection and the fogging projection with invisible-light (for invisible-light illumination) in turn, where the output information corresponding to the speckle projection and the fogging projection with invisible-light can be the first depth map (e.g. the SL depth map) and the second depth map (e.g. the TOF depth map), respectively.

Additionally, when the depth statistics index indicates a long-distance range among the multiple predetermined distance ranges, the image processing circuit 130 (e.g. the depth processor 131) can control the adaptive projector 110 to perform the fogging projection of one cycle with invisible-light (for invisible-light illumination) and the fogging projection of another cycle with invisible-light (for invisible-light illumination) in turn, where the output information corresponding to the fogging projection of the one cycle with invisible-light and the fogging projection of the other cycle with invisible-light can be the second depth map (e.g. the TOF depth map) and the 2D image, respectively. For brevity, similar descriptions for these embodiments are not repeated in detail here.

According to some embodiments, in addition to the hybrid depth detection device 100, the electronic product may further comprise a processing circuit (e.g. the SoC) for controlling operations of the electronic product, and the processing circuit may comprise at least one application processor (e.g. one or more application processors) for running various program codes such as an operating system (OS), drivers, application programs, etc. Under control of a first application (App) (e.g. a 3D face recognition App) running on the at least one application processor, the processing circuit may send one or more commands to the hybrid depth detection device 100 for controlling the hybrid depth detection device 100.

Figure 8:
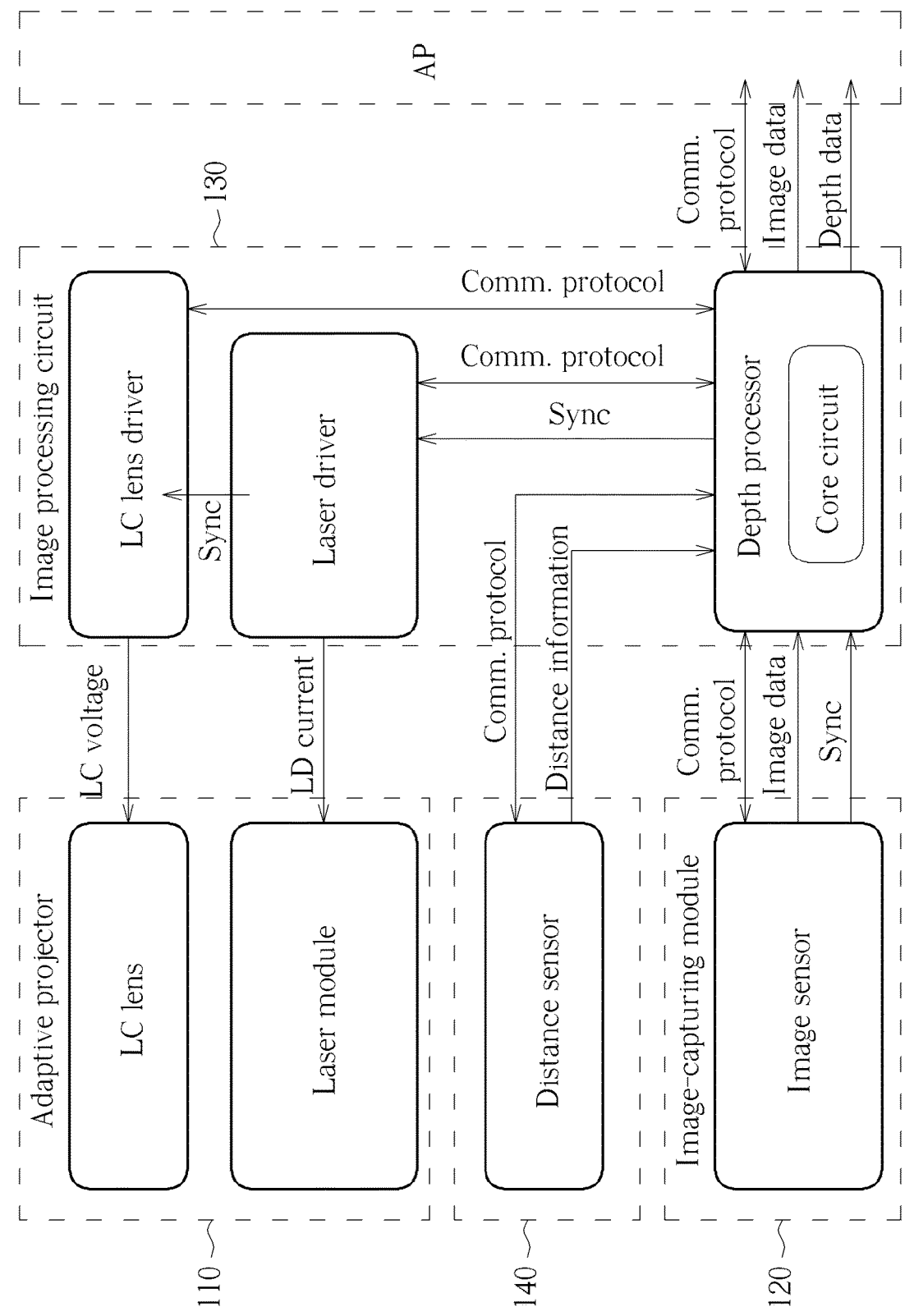
FIG. 8 illustrates some implementation details of the hybrid depth detection device shown in FIG. 1 according to an embodiment of the present invention.

FIG. 8 illustrates some implementation details of the hybrid depth detection device 100 shown in FIG. 1 according to an embodiment of the present invention. As shown in FIG. 8, the hybrid depth detection device 100 (e.g. the components therein, such as the adaptive projector 110, the image-capturing module 120, the image processing circuit 130, and an additional sensing module 140 comprising a distance sensor) can operate under control of the at least one application processor (collectively referred to as "AP" for brevity) within the processing circuit of the electronic product, where the image sensor of the camera 121 within the image-capturing module 120 is also illustrated for better comprehension, but the present invention is not limited thereto. In some embodiments, the additional sensing module 140 (e.g. the distance sensor) can be omitted. In addition, the one or more driving circuits within the image processing circuit 130 may comprise a LC lens driver, for driving the at least one LC lens with one or more LC voltage signals (labeled "LC voltage" for brevity), and may comprise a laser driver, for driving the at least one invisible-light source such as the VCSEL array, the edge-emitting LDs, etc. with one or more LD current signals (labeled "LD current" for brevity). Some components within the architecture shown in FIG. 8 can communicate with each other, for example, by using some synchronization (sync) signals and one or more predetermined communications protocols (respectively labeled "Sync" and "Comm. protocol" for brevity). Additionally, a core circuit within the depth processor 131 can control operations of the depth processor 131. The depth processor 131 can obtain image data of raw images from the image sensor of the camera 121 within the image-capturing module 120, perform associated processing such as depth processing, etc., and output associated data such as image data, depth data, etc. to the AP. For brevity, similar descriptions for this embodiment are not repeated in detail here.

Figure 9:
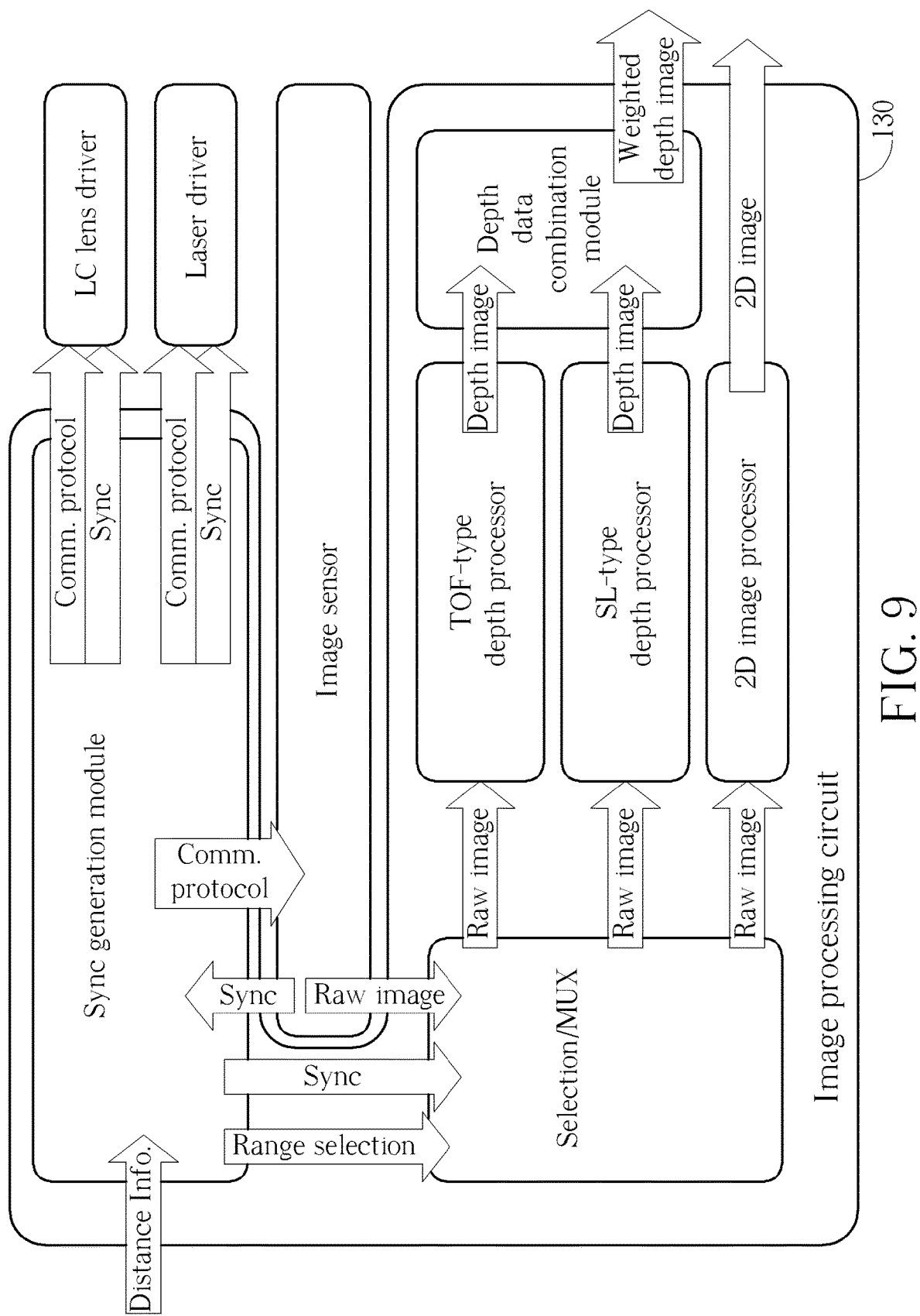
FIG. 9 illustrates a depth-combination control scheme of the method according to an embodiment of the present invention.

FIG. 9 illustrates a depth-combination control scheme of the method according to an embodiment of the present invention. The image processing circuit 130 may comprise a sync generation module for generating some sync signals (labeled "Sync" for brevity) and communicating with some other components using the one or more predetermined communications protocols (labeled "Comm. protocol" for brevity), and comprise a selection and multiplexing module (labeled "Selection/MUX" for brevity), for obtaining and/or dispatching associated information such as range selection information (labeled "Range selection" for brevity) indicating the distance range (e.g. the distance range that has been selected from the multiple predetermined distance ranges), the raw images, etc., and the depth processor 131 within the image processing circuit 130 may comprise a TOF-type depth processor a SL-type depth processor, for performing the TOF-type depth detection and the SL-type depth detection, respectively, and comprise a depth data combination module for performing the depth data combination, where the image processor 132 can be referred to as the 2D image processor, but the present invention is not limited thereto. In some embodiments, the architecture shown in FIG. 9 may vary.

According to some embodiments, the sync generation module may comprise a sub-module such as a depth statistics module for performing depth statistics with respect to frames. The depth information received by the sync generation module can be replaced by a previous depth frame, and the sync generation module can perform the depth statistics according to the previous depth frame to calculate the depth APL of the previous depth frame as a predicted depth APL of the current depth frame to be generated, in order to generate the range selection information and the associated sync signal for being outputted to the selection and multiplexing module. More particularly, the current depth frame (e.g. the weighted depth image) being generated by the image processing circuit 130 can be the depth frame F(n), and the previous depth frame can be the depth frame F(n−1) (e.g. weighted depth frame F(n−1)). For brevity, similar descriptions for these embodiments are not repeated in detail here.

Figure 10:
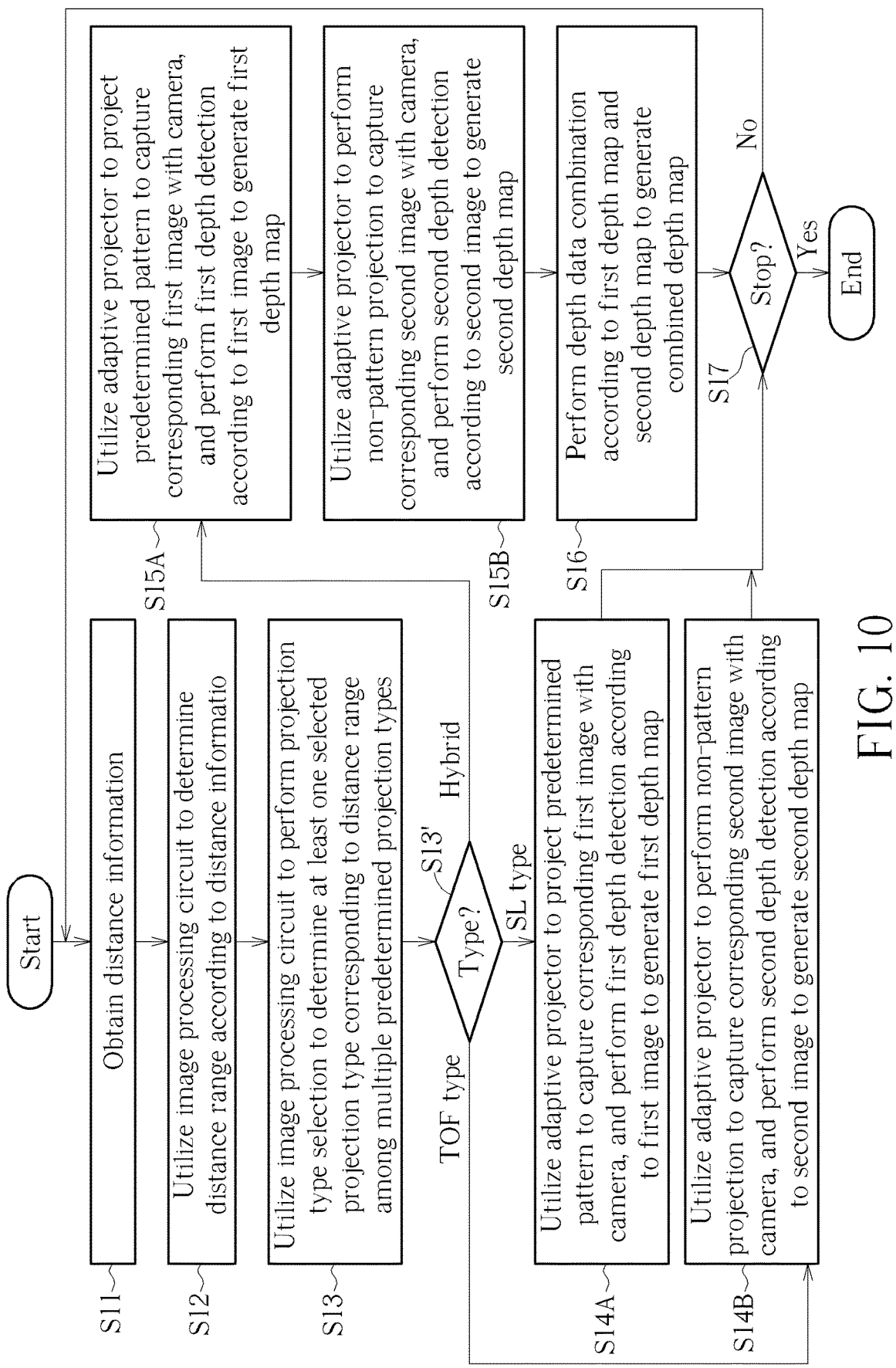
FIG. 10 illustrates a working flow of the method according to an embodiment of the present invention.

FIG. 10 illustrates a working flow of the method according to an embodiment of the present invention. The method may be applied to the associated apparatus (e.g. the hybrid depth detection device 100, the image processing circuit 130, the depth processor 131, and the adaptive projector 110), and may be executed by the apparatus.

In Step S11, the image processing circuit 130 (e.g. the second partial circuit such as the depth processor 131) can obtain the distance information, where the distance information may indicate the distance between the hybrid depth detection device 100 and the one or more target objects 11. For example, the distance information can be obtained from the distance sensor, but the present invention is not limited thereto. In some examples, the information source of the distance information may comprise one or a combination of the distance sensor and a previous depth detection operation (e.g. the hybrid depth detection operation for a previous frame) of the hybrid depth detection device 100.

In Step S12, the hybrid depth detection device 100 can utilize the image processing circuit 130 (e.g. the second partial circuit such as the depth processor 131) to determine the distance range (e.g. the selected distance range) according to the distance information (e.g. the distance indicated by the distance information), where the distance range is selected from the multiple predetermined distance ranges regarding the distance. When the distance indicated by the distance information falls within a certain predetermined distance range of the multiple predetermined distance ranges, the image processing circuit 130 (e.g. the second partial circuit such as the depth processor 131) can determine this distance range as the selected distance range. When the distance indicated by the distance information falls within another predetermined distance range of the multiple predetermined distance ranges, the image processing circuit 130 (e.g. the second partial circuit such as the depth processor 131) can determine the other distance range as the selected distance range.

In Step S13, the hybrid depth detection device 100 can utilize the image processing circuit 130 (e.g. the second partial circuit such as the depth processor 131) to perform the projection type selection to determine the at least one selected projection type corresponding to the distance range (e.g. the selected distance range) among the multiple predetermined projection types (e.g. the first projection type and the second projection type), where the at least one selected projection type is selected from the multiple predetermined projection types.

In Step S13', in response to the at least one selected projection type, the image processing circuit 130 (e.g. the second partial circuit such as the depth processor 131) can trigger execution of one of multiple sub-flows of the working flow. For example, if the at least one selected projection type represents the first projection type regarding the pattern projection for the pattern-detection-type depth detection such as the SL-type depth detection (labeled "SL type" for better comprehension), a first sub-flow comprising Step S14A is executed; otherwise, if the at least one selected projection type represents the second projection type regarding the non-pattern projection for the TOF-type depth detection (labeled "TOF type" for better comprehension), a second sub-flow comprising Step S14B is executed; otherwise, in a situation where the at least one selected projection type comprises both of the first projection type and the second projection type (labeled "Hybrid" for better comprehension), a third sub-flow comprising Steps S15A, S15B and S16 is executed.

In Step S14A, the hybrid depth detection device 100 can utilize the adaptive projector 110 to perform the pattern projection, and more particularly, project the predetermined pattern, to capture at least one corresponding first image such as one or more first images with the camera 121, and utilize the image processing circuit 130 (e.g. the second partial circuit such as the depth processor 131) to perform the first depth detection according to the one or more first images to generate the first depth map, for being outputted as the resultant depth map.

In Step S14B, the hybrid depth detection device 100 can utilize the adaptive projector 110 to perform the non-pattern projection to capture at least one corresponding second image such as one or more second images with the camera 121, and utilizing the image processing circuit 130 (e.g. the second partial circuit such as the depth processor 131) to perform the second depth detection according to the one or more second images to generate the second depth map, for being outputted as the resultant depth map.

In Step S15A, the hybrid depth detection device 100 can utilize the adaptive projector 110 to perform the pattern projection, and more particularly, project the predetermined pattern, to capture at least one corresponding first image such as one or more first images with the camera 121, and utilize the image processing circuit 130 (e.g. the second partial circuit such as the depth processor 131) to perform the first depth detection according to the one or more first images to generate the first depth map.

In Step S15B, the hybrid depth detection device 100 can utilize the adaptive projector 110 to perform the non-pattern projection to capture at least one corresponding second image such as one or more second images with the camera 121, and utilizing the image processing circuit 130 (e.g. the second partial circuit such as the depth processor 131) to perform the second depth detection according to the one or more second images to generate the second depth map.

In Step S16, in a situation where the at least one selected projection type comprises the multiple predetermined projection types such as both of the first projection type and the second projection type, the hybrid depth detection device 100 can utilize the image processing circuit 130 (e.g. the second partial circuit such as the depth processor 131) to perform the depth data combination according to the first depth map and the second depth map to generate the combined depth map (e.g. the weighted depth map) as the resultant depth map.

In Step S17, the hybrid depth detection device 100 (e.g. the image processing circuit 130) can determine whether to stop the working flow. If Yes, the working flow comes to the end; if No, Step S11 is entered.

For example, in response to a start command among the one or more commands, the hybrid depth detection device 100 (e.g. the image processing circuit 130) can start operating according to this working flow, for returning the resultant depth map (e.g. the first depth map of the first sub-flow, the second depth map of the second sub-flow, or the combined depth map of the third sub-flow) to the processing circuit (e.g. the 3D face recognition App, etc. running on the at least one application processor). In Step S17, the hybrid depth detection device 100 (e.g. the image processing circuit 130) can check whether a stop command among the one or more commands is received. When the stop command has been received from the processing circuit, the hybrid depth detection device 100 (e.g. the image processing circuit 130) can determine the checking result of Step S17 to be Yes. When no stop command has been received from the processing circuit, the hybrid depth detection device 100 (e.g. the image processing circuit 130) can determine the checking result of Step S17 to be No. For brevity, similar descriptions for this embodiment are not repeated in detail here.

For better comprehension, the method may be illustrated with the working flow shown in FIG. 10, but the present invention is not limited thereto. According to some embodiments, one or more steps may be added, deleted, or changed in the working flow shown in FIG. 10. For example, in the third sub-flow comprising Steps S15A, S15B and S16, the order of executing Steps S15A and S15B can be exchanged.

According to some embodiments, the multiple predetermined distance ranges may comprise a first range (e.g. the short-distance range) such as that of the interval [D1, D1.5), a second range (e.g. the medium-distance range) such as that of the interval [D1.5, D2), and a third range (e.g. the long-distance range) such as that of the interval [D2, ∞), where the distance D1.5 may represent an intermediate distance between the distances D1 and D2, such as the intermediate distance $(w_{D1}*D1+w_{D2}*D2)$ defined with predetermined weighting values $w_{D1}$ and $w_{D2}$ (e.g. $w_{D1}>0$ and $w_{D2}>0$, and $w_{D1}+w_{D1}=1$), but the present invention is not limited thereto. In addition, when the selected distance range represents the range of the interval [D1, D1.5), the at least one selected projection type may represent the first projection type, to allow the first sub-flow comprising Step S14A to be executed, where the projection field as shown in the upper half of FIG. 3 can be taken as an example of the projection field of the pattern projection; when the selected distance range represents the range of the interval [D1.5, D2), the at least one selected projection type may comprise both of the first projection type and the second projection type, to allow the third sub-flow comprising Steps S15A, S15B and S16 to be executed, where the projection field as shown in the upper half of FIG. 3 can be taken as an example of any (e.g. each) of the respective projection fields of the pattern projection and the non-pattern projection; and when the selected distance range represents the range of the interval [D2, ∞), the at least one selected projection type may represent the second projection type, to allow the second sub-flow comprising Step S14B to be executed, where the projection field as shown in the lower half of FIG. 3 can be taken as an example of the projection field of the non-pattern projection. For brevity, similar descriptions for these embodiments are not repeated in detail here.

According to some embodiments, the multiple predetermined distance ranges may comprise a first range such as that of the interval [D1, D2), and comprise a second range such as that of the interval [D2, ∞), but the present invention is not limited thereto. In addition, when the selected distance range represents the range of the interval [D1, D2), the at least one selected projection type may comprise both of the first projection type and the second projection type, to allow the third sub-flow comprising Steps S15A, S15B and S16 to be executed, where the projection field as shown in the upper half of FIG. 3 can be taken as an example of any (e.g. each) of the respective projection fields of the pattern projection and the non-pattern projection; and when the selected distance range represents the range of the interval [D2, ∞), the at least one selected projection type may represent the second projection type, to allow the second sub-flow comprising Step S14B to be executed, where the projection field as shown in the lower half of FIG. 3 can be taken as an example of the projection field of the non-pattern projection; wherein the first sub-flow can be omitted. For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing hybrid depth detection with aid of an adaptive projector, the method comprising:
utilizing an image processing circuit within a hybrid depth detection device to obtain distance information, wherein the distance information indicates a distance between the hybrid depth detection device and one or more target objects;
utilizing the image processing circuit to determine a distance range according to the distance information, wherein the distance range is selected from multiple predetermined distance ranges regarding the distance;
utilizing the image processing circuit to perform projection type selection to determine at least one selected projection type corresponding to the distance range among multiple predetermined projection types, wherein the at least one selected projection type is selected from the multiple predetermined projection types;
utilizing the adaptive projector within the hybrid depth detection device to perform projection of the at least one selected projection type to capture at least one corresponding image with a camera, and utilizing the image processing circuit to perform at least one type of depth detection corresponding to the at least one selected projection type among multiple types of depth detection according to the at least one corresponding image to generate at least one depth map; and in response to the at least one selected projection type, utilizing the image processing circuit to selectively output the at least one depth map as a resultant depth map or perform depth data combination according to the at least one depth map to generate a combined depth map as the resultant depth map.

2. The method of claim 1, wherein the multiple predetermined projection types comprise a first projection type regarding pattern projection of one or more predetermined patterns, and comprise a second projection type regarding non-pattern projection of no pattern.

3. The method of claim 2, wherein the multiple types of depth detection comprise first depth detection corresponding to the first projection type, and comprise second depth detection corresponding to the second projection type.

4. The method of claim 3, wherein the first depth detection represents pattern-detection-type depth detection, and the second depth detection represents Time-of-Flight (TOF)-type depth detection.

5. The method of claim 1, wherein the at least one selected projection type corresponding to the distance range comprises the multiple predetermined projection types, and the at least one type of depth detection corresponding to the at least one selected projection type comprises the multiple types of depth detection.

6. The method of claim 5, wherein the multiple predetermined projection types comprise a first projection type regarding pattern projection and a second projection type regarding non-pattern projection; and utilizing the adaptive projector within the hybrid depth detection device to perform the projection of the at least one selected projection type to capture the at least one corresponding image with the camera and utilizing the image processing circuit to perform the at least one type of depth detection corresponding to the at least one selected projection type among the multiple types of depth detection according to the at least one corresponding image to generate at least one depth map further comprises:

utilizing the adaptive projector to perform the pattern projection to capture at least one corresponding first image with the camera, and utilizing the image processing circuit to perform first depth detection according to the at least one corresponding first image to generate a first depth map; and utilizing the adaptive projector to perform the non-pattern projection to capture at least one corresponding second image with the camera, and utilizing the image processing circuit to perform second depth detection according to the at least one corresponding second image to generate a second depth map;

wherein, in a situation where the at least one selected projection type comprises the multiple predetermined projection types, the image processing circuit is arranged to perform the depth data combination according to the first depth map and the second depth map to generate the combined depth map as the resultant depth map.

7. The method of claim 1, wherein utilizing the image processing circuit to selectively output the at least one depth map as the resultant depth map or perform the depth data combination according to the at least one depth map to generate the combined depth map as the resultant depth map further comprises:

if the at least one selected projection type represents one of the multiple predetermined projection types, utilizing the image processing circuit to output the at least one depth map as the resultant depth map, wherein the at least one depth map represents a depth map corresponding to the one of the multiple predetermined projection types; otherwise, utilizing the image processing circuit to perform the depth data combination according to the at least one depth map to generate the combined depth map as the resultant depth map, wherein the at least one depth map comprises a first depth map corresponding to a first projection type of the multiple predetermined projection types, and comprises a second depth map corresponding to a second projection type of the multiple predetermined projection types.

8. The method of claim 1, wherein an information source of the distance information comprises one or a combination of a distance sensor within the hybrid depth detection device and a previous depth detection operation of the hybrid depth detection device.

9. The adaptive projector that operates according to the method of claim 1.

10. The image processing circuit that operates according to the method of claim 1.

11. A hybrid depth detection device, comprising:

an image processing circuit, arranged to obtain distance information, determines a distance range according to the distance information, and perform projection type selection to determine at least one selected projection type corresponding to the distance range among multiple predetermined projection types, wherein the distance information indicates a distance between the hybrid depth detection device and one or more target objects, the distance range is selected from multiple predetermined distance ranges regarding the distance, and the at least one selected projection type is selected from the multiple predetermined projection types;

an adaptive projector, coupled to the image processing circuit, arranged to perform projection of the at least one selected projection type to allow the hybrid depth detection device to capture at least one corresponding image with a camera; and the camera, coupled to the image processing circuit, arranged to capture the at least one corresponding image;

wherein:

the image processing circuit performs at least one type of depth detection corresponding to the at least one selected projection type among multiple types of depth detection according to the at least one corresponding image to generate at least one depth map; and in response to the at least one selected projection type, the image processing circuit selectively outputs the at least one depth map as a resultant depth map or performs depth data combination according to the at least one depth map to generate a combined depth map as the resultant depth map.

* * * * *